US012597306B2

(12) United States Patent
Shih et al.

(10) Patent No.: US 12,597,306 B2
(45) Date of Patent: Apr. 7, 2026

(54) ELECTRIC LOCK AND CONTROL METHOD THEREOF

(71) Applicant: TAIWAN FU HSING INDUSTRIAL CO., LTD., Kaohsiung City (TW)

(72) Inventors: I-Chang Shih, Kaohsiung City (TW); Shih-Min Lu, Kaohsiung City (TW); Pi-Shun Chang, Kaohsiung City (TW); Yen-Tang Lin, Kaohsiung City (TW)

(73) Assignee: TAIWAN FU HSING INDUSTRIAL CO., LTD., Kaohsiung City (TW)

( * ) Notice: Subject to any disclaimer, the term of this patent is extended or adjusted under 35 U.S.C. 154(b) by 275 days.

(21) Appl. No.: 18/497,639

(22) Filed: Oct. 30, 2023

(65) Prior Publication Data

US 2024/0185655 A1 Jun. 6, 2024

(30) Foreign Application Priority Data

Dec. 2, 2022 (TW) ................................ 111146386

(51) Int. Cl.
*G07C 9/00* (2020.01)

(52) U.S. Cl.
CPC .................... *G07C 9/00309* (2013.01); *G07C 2009/00373* (2013.01); *G07C 2009/00388* (2013.01)

(58) Field of Classification Search
CPC ...... G07C 9/00309; G07C 2009/00373; G07C 2009/00388
See application file for complete search history.

(56) References Cited

U.S. PATENT DOCUMENTS

| | | | | |
|---|---|---|---|---|
| 10,515,498 | B2 * | 12/2019 | Chang | G07C 9/00571 |
| 2010/0207723 | A1 * | 8/2010 | Cao | G07C 9/00309 340/5.61 |
| 2011/0025459 | A1 * | 2/2011 | Denison | G07F 7/1008 340/5.51 |
| 2016/0133071 | A1 | 5/2016 | Henderson | |
| 2016/0307681 | A1 * | 10/2016 | Shaffer | E05B 47/0001 |
| 2020/0193375 | A1 | 6/2020 | Santangeli et al. | |
| 2020/0327757 | A1 * | 10/2020 | Kelley | G07C 9/00309 |
| 2020/0392757 | A1 * | 12/2020 | Jeng | G07C 9/0069 |
| 2021/0082215 | A1 * | 3/2021 | Lee | G06F 3/0484 |
| 2021/0214970 | A1 * | 7/2021 | Yang | E05B 47/0001 |

* cited by examiner

*Primary Examiner* — Mark A Williams
(74) *Attorney, Agent, or Firm* — Best & Flanagan LLP

(57) ABSTRACT

An electric lock includes an input unit, a main controller electrically connected to the input unit, a driving module, a motor connected to the driving module, and a motor controller independent of the main controller and storing control parameters of the motor. The main controller includes a processing unit configured to control the input unit to receive a user input. When the main controller receives the user input and determines that the motor controller is in a sleep mode, the main controller transmits a wake-up signal to the motor controller for waking up the motor controller. When the motor controller is woken up, the main controller transmits a control signal to the motor controller, and the motor controller controls the motor to drive the driving module to drive a predetermined mechanism of the electric lock to move according to the control signal and the control parameters of the motor.

18 Claims, 4 Drawing Sheets

ELECTRIC LOCK AND CONTROL METHOD THEREOF

BACKGROUND OF THE INVENTION

1. Field of the Invention

The present invention relates to an electric lock, and more particularly to an electric lock capable of reducing development difficulty.

2. Description of the Prior Art

Generally, an electric lock has an input unit, a controller, a motor and a driving module. The controller of the electric lock of the prior art must control the overall operations of the electric lock. For example, the controller is configured to control the input unit to receive a user input according to a user interface program, verify the user input according to verification data, and control the motor to drive the driving module according to control parameters of the motor when verification of the user input is successful, in order to perform a locking/unlocking operation or a clutching operation. In a development process of the electric lock of the prior art, a developer must integrate the user interface program, the verification mechanism and the control parameters of the motor into a single controller. The user interface program, the verification mechanism and the control parameters of the motor cannot be developed separately in the electric lock of the prior art. Therefore, the development of the electric lock of the prior art is more difficult.

SUMMARY OF THE INVENTION

The present invention provides an electric lock and a control method thereof in order to solve the problems of the prior art.

The electric lock of the present invention comprises an input unit, a main controller electrically connected to the input unit, a driving module, a motor connected to the driving module and a motor controller independent of the main controller. The main controller comprises a processing unit configured to control the input unit to receive a user input. The motor controller stores control parameters of the motor. When the main controller receives the user input and determines that the motor controller is in a sleep mode, the main controller is configured to transmit a wake-up signal to the motor controller for waking up the motor controller. When the motor controller is woken up, the main controller is configured to transmit a control signal to the motor controller, and the motor controller is configured to control the motor to drive the driving module to drive a predetermined mechanism of the electric lock to move according to the control signal and the control parameters of the motor.

The control method of the electric lock of the present invention comprises providing an electric lock comprising an input unit, a main controller, a driving module, a motor and a motor controller, wherein the main controller comprises a processing unit, the motor controller is independent of the main controller and configured to store control parameters of the motor; the processing unit controlling the input unit to receive a user input; when the main controller receives the user input and determines that the motor controller is in a sleep mode, the main controller transmitting a wake-up signal to the motor controller for waking up the motor controller; and when the motor controller is woken up, the main controller transmitting a control signal to the motor controller, and the motor controller controlling the motor to drive the driving module to drive a predetermined mechanism of the electric lock to move according to the control signal and the control parameters of the motor.

In contrast to the prior art, the motor controller of the electric lock of the present invention is independent of the main controller. Therefore, the user interface program and the verification mechanism in the main controller and the control parameters of the motor in the motor controller can be developed separately, so as to reduce development difficulty of the electric lock. In addition, the motor controller of the electric lock of the present invention can enter the sleep mode when there is no predetermined operation required to be performed in order to reduce power consumption.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
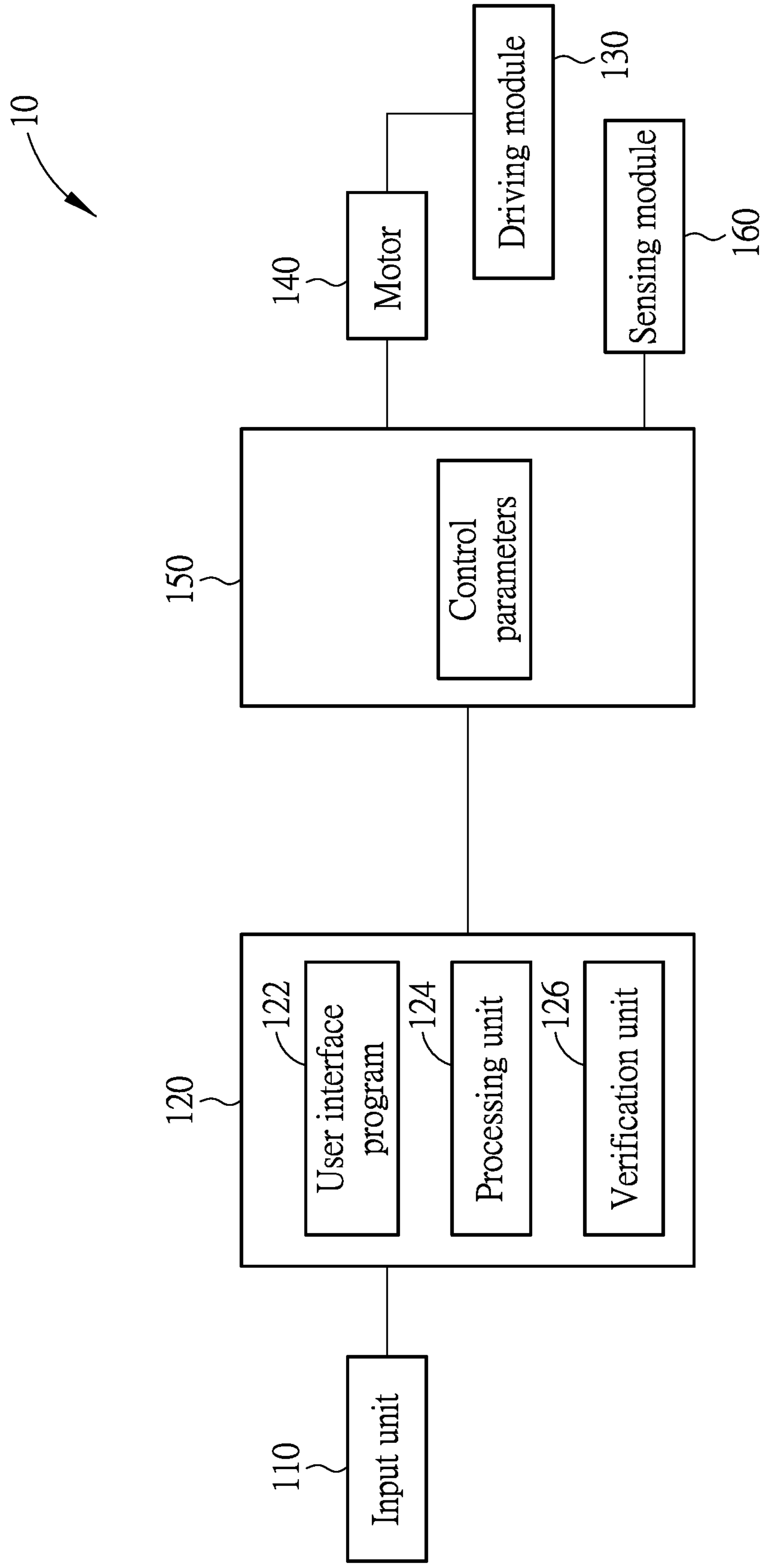
FIG. 1 is a functional block diagram of an electric lock of a first embodiment of the present invention.

Please refer to FIG. 1. FIG. 1 is a functional block diagram of an electric lock of a first embodiment of the present invention. As shown in FIG. 1, the electric lock 10 of the present invention comprises an input unit 110, a main controller 120, a driving module 130, a motor 140 and a motor controller 150. The input unit 110 can comprise an input panel configured to receive button input or touch input, but the present invention is not limited thereto. The input unit 110 can also comprise other types of input devices, such as a biometric authentication device (configured to recognize a fingerprint, a face, a sound, an iris, etc.).

The main controller 120 is electrically connected to the input unit 110. The main controller 120 comprises a user interface program 122, a processing unit 124 and a verification unit 126. The processing unit 124 is configured to control the input unit 110 to receive a user input according to the user interface program 122. For example, the processing unit 124 is configured to control the input unit 110 to receive a password, a fingerprint or a setting command according to the user interface program 122, and the processing unit 124 is further configured to perform a corresponding operation according to the password, the fingerprint or the setting command received by the input unit 110. When the input unit 110 receives a user input required to verified (such as a password or a fingerprint), the verification unit 126 is configured to compare the user input verification data (such as predetermined password or registered fingerprint data) pre-stored in the verification unit 126 to generate a comparison result. When the input unit 110 receives a user input comprising a setting command, the processing unit 124 is configured to perform a corresponding setting according to the user input, such as changing the verification data pre-stored in the verification unit 126 or resetting the electric lock 10.

The driving module 130 is configured to drive a predetermined mechanism of the electric lock 10 to move in order to perform a predetermined operation. For example, the predetermined mechanism can be a latch mechanism of the electric lock 10, and the driving module 130 is configured to drive the latch mechanism to move in order to perform a locking operation or an unlocking operation; or the predetermined mechanism can be a clutch mechanism of the electric lock 10, and the driving module 130 is configured to drive the clutch mechanism to move in order to perform the locking operation or the unlocking operation, but the present invention is not limited thereto. The motor 140 is connected to the driving module 130. When the motor 140 is rotated, the motor 140 is configured to drive the driving module 130 to move in order to perform the aforementioned operations.

The motor controller 150 is independent of the main controller 120. The motor controller 150 stores control parameters of the motor 140, such as motor forward and reverse running time, motor running compensation time, pulse width modulation (PWM) parameters and motor power supply voltage parameters, etc., but the present invention is limited thereto. The motor controller 150 is configured to control the motor 140 to rotate according to the control parameters of the motor 140 in order to further drive the driving module 130. In the first embodiment of the electric lock of the present invention, the motor controller 150 communicates with the main controller 120 through a wired connection. For example, the motor controller 150 is electrically connected to the main controller 120 through I2C, SPI, UART, USB, RS485, RS232, SDIO, etc. for communicating with the main controller 120, but the present invention is not limited thereto.

Figure 2:
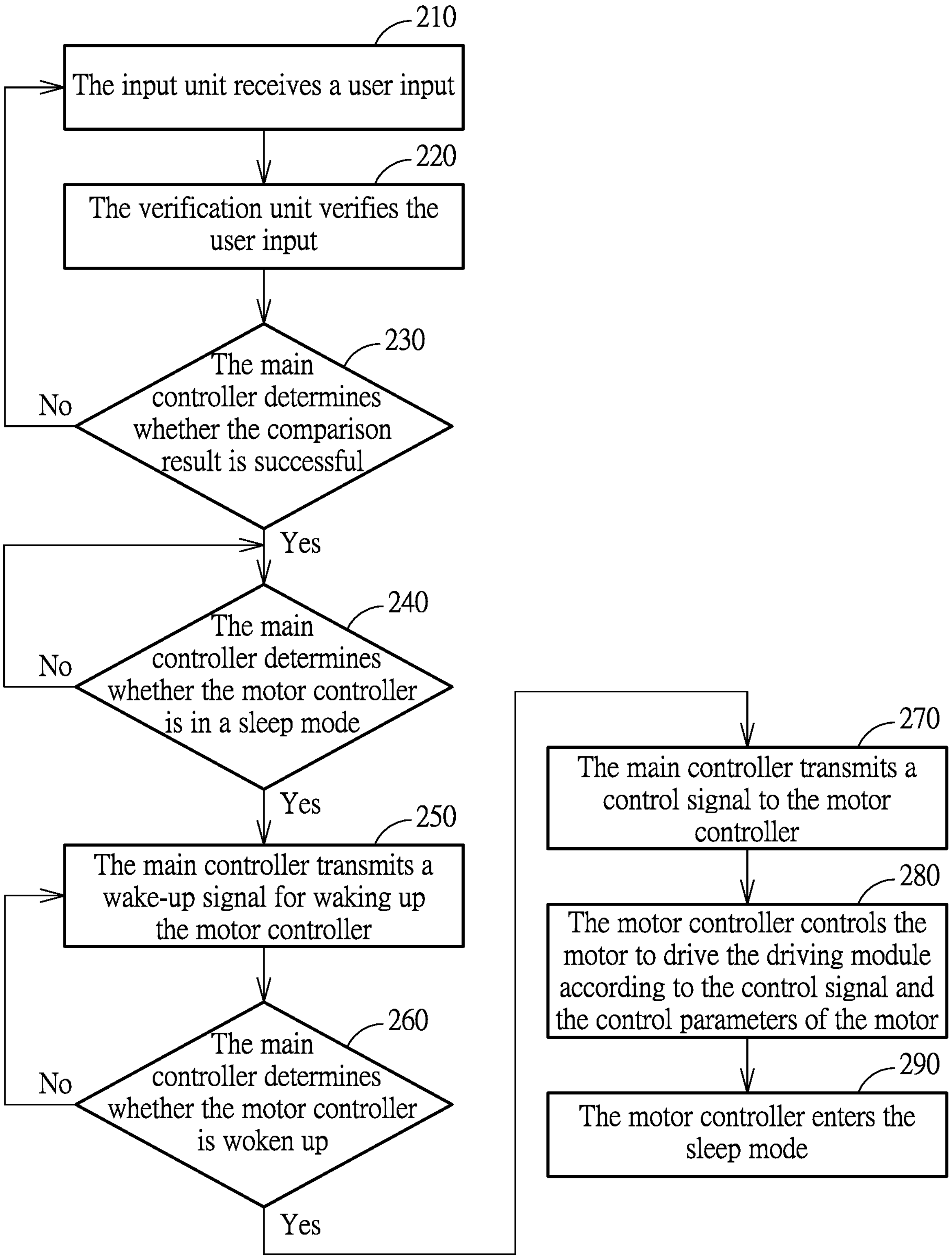
FIG. 2 is a flowchart showing a control method of the electric lock of the first embodiment of the present invention.

Please refer to FIG. 2, and refer to FIG. 1 as well. FIG. 2 is a flowchart showing a control method of the electric lock of the first embodiment of the present invention. When the processing unit 124 controls the input unit 110 to receive a user input required to be verified according to the user interface program 122 (step 210), the verification unit 126 further compares the user input with the verification data pre-stored in the verification unit 126 to generate a comparison result (step 220). The processing unit 124 of the main controller 120 then determines whether the comparison result is successful according to the comparison result generated by the verification unit 126 (step 230). When the processing unit 124 of the main controller 120 determines that the comparison result is failed, step 210 is continued. When the processing unit 124 of the main controller 120 determines that the comparison result is successful, the processing unit 124 of the main controller 120 further determines whether the motor controller 150 is in a sleep mode (step 240). In the present embodiment, the processing unit 124 of the main controller 120 is configured to determine whether the motor controller 150 is in the sleep mode according to a potential of a contact pin of the motor controller 150. For example, when a logic level of the contact pin of the motor controller 150 is 1, the processing unit 124 of the main controller 120 determines that the motor controller 150 is not in the sleep mode; when the logic level of the contact pin of the motor controller 150 is 0, the processing unit 124 of the main controller 120 determines that the motor controller 150 is in the sleep mode, but the present invention is not limited thereto. The motor controller 150 can also transmit other types of state signals to the main controller 120. When the processing unit 124 of the main controller 120 determines that the motor controller 150 is not in the sleep mode, the main controller 120 will re-execute step 240 after a predetermined time interval (such arrangement can prevent the motor controller 150 from receiving a new command when executing a previous command); when the processing unit 124 of the main controller 120 determines that the motor controller 150 is in the sleep mode, the main controller 120 transmits a wake-up signal to the motor controller 150 for waking up the motor controller 150 (step 250). The processing unit 124 of the main controller 120 can further determine whether the motor controller 150 is woken up according to the potential of the contact pin of the motor controller 150 (step 260). If the motor controller 150 is not woken up, the main controller 120 will re-execute step 250. When the motor controller 150 is woken up, the main controller 120 transmits a control signal to the motor controller 150 (step 270), and the motor controller 150 controls the motor 140 to drive the driving module 130 according to the control signal and the control parameters of the motor 140 (step 280) in order to perform a predetermined operation, such as the locking operation or the unlocking operation. After the motor controller 150 controlling the motor 140 to drive the driving module 130 to complete the predetermined operation, the motor controller 150 will enter the sleep mode again (step 290). For example, the motor controller 150 can automatically enter the sleep mode a predetermined time after controlling the motor 140 to drive the driving module 130 to complete the predetermined operation; or the motor controller 150 can report to the main controller 120 after controlling the motor 140 to drive the driving module 130 to complete the predetermined operation, and the main controller 120 then transmits a sleep command to the motor controller 150 to command the motor controller 150 to enter the sleep mode.

In addition, in the control method of the electric lock of the first embodiment of the present invention, the aforementioned steps need not be in the exact order shown. That is, the order of the steps can be changed and other steps can be inserted in between. For example, before step 210, the main controller 120 can enter a main sleep mode, and when the input unit 110 receives a user input (for example, a user presses a button or touches a touch panel), the input unit 110 can correspondingly generate a signal to wake up the main controller 120. On the other hand, the motor controller 150 can report to the main controller 120 that the predetermined operation is completed after controlling the motor 140 to drive the driving module 130 to complete the predetermined operation.

Furthermore, in other embodiments, when the processing unit 124 of the main controller 120 determines that the motor controller 150 is not in the sleep mode in step 240, the main controller 120 can directly transmits a control signal to the motor controller 150, that is, directly execute step 270.

Figure 3:
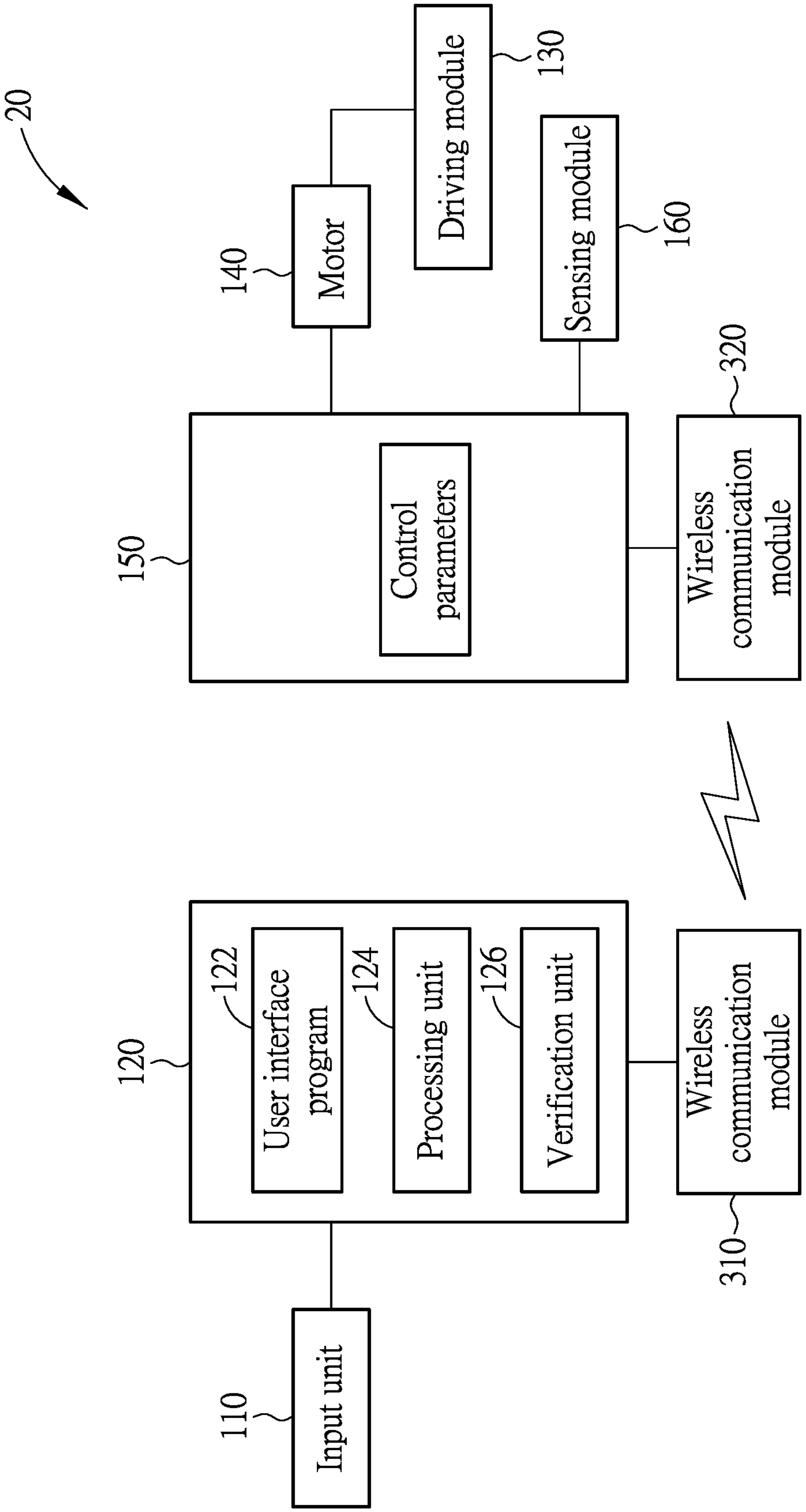
FIG. 3 is a functional block diagram of an electric lock of a second embodiment of the present invention.

Please refer to FIG. 3. FIG. 3 is a functional block diagram of an electric lock of a second embodiment of the present invention. As shown in FIG. 3, most components of the electric lock of the second embodiment of the present invention are identical to those of the electric lock of the first embodiment of the present invention. In the second embodiment of the present invention, the electric lock 20 further comprises wireless communication modules 310, 320 electrically connected to the main controller 120 and the motor controller 150 respectively. The motor controller 150 is configured to communicate with the main controller 120 wirelessly. For example, the motor controller 150 can communicate with the main controller 120 through Infrared, Bluetooth, Wi-Fi, ZIGBEE, Z-WAVE, BLE, SUB-1 GHz, etc., but the present invention is not limited thereto. Since the motor controller 150 of the electric lock 20 is configured to communicate with the main controller 120 wirelessly, the input unit 110 and the main controller 120 of the electric lock 20 can be installed at a position farther away from the motor controller 150 according to requirements, so as to increase design flexibility of the electric lock.

Figure 4:
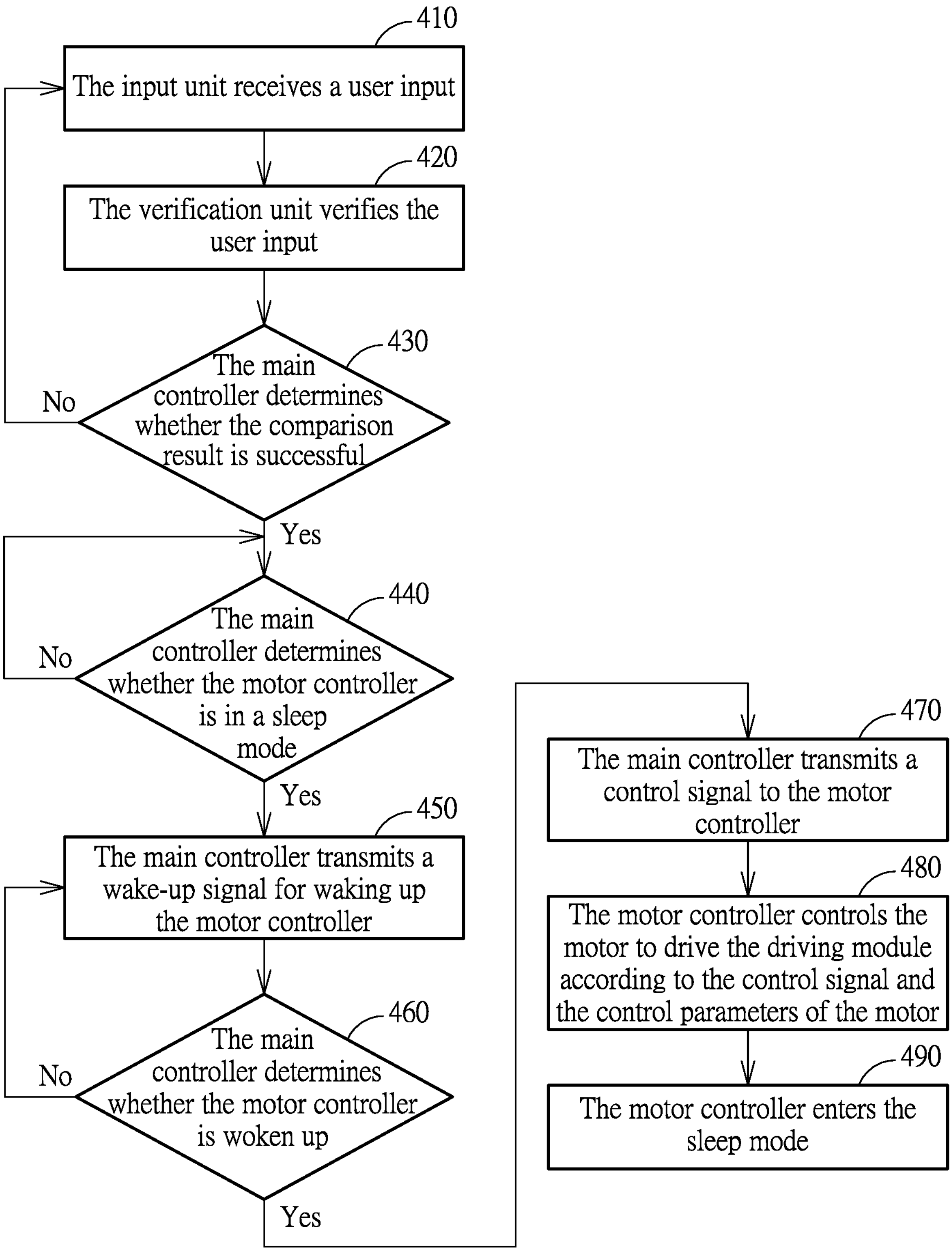
FIG. 4 is a flowchart showing a control method of the electric lock of the second embodiment of the present invention.

Please refer to FIG. 4, and refer to FIG. 3 as well. FIG. 4 is a flowchart showing a control method of the electric lock of the second embodiment of the present invention. When the processing unit 124 controls the input unit 110 to receive a user input required to be verified according to the user interface program 122 (step 410), the verification unit 126 further compares the user input with the verification data pre-stored in the verification unit 126 to generate a comparison result (step 420). The processing unit 124 of the main controller 120 then determines whether the comparison result is successful according to the comparison result generated by the verification unit 126 (step 430). When the processing unit 124 of the main controller 120 determines that the comparison result is failed, step 410 is continued. When the processing unit 124 of the main controller 120 determines that the comparison result is successful, the processing unit 124 of the main controller 120 further determines whether the motor controller 150 is in the sleep mode (step 440). In the present embodiment, the motor controller 150 is configured to wirelessly transmit a state signal to the main controller 120, and the main controller 120 is configured to determine whether the motor controller 150 is in the sleep mode according to the state signal. For example, before the motor controller 150 enter the sleep mode, the motor controller 150 is configured to transmit a sleep state signal to the main controller 120 in order to notify the main controller 120 that the motor controller 150 is going to enter the sleep mode; when the motor controller 150 is woken up, the motor controller 150 is configured to transmit a wake-up state signal to the main controller 120 in order to notify the main controller 120 that the motor controller 150 is no longer in the sleep mode. When the processing unit 124 of the main controller 120 determines that the motor controller 150 is not in the sleep mode, the main controller 120 will re-execute step 440 after a predetermined time interval (such arrangement can prevent the motor controller 150 from receiving a new command when executing a previous command); when the processing unit 124 of the main controller 120 determines that the motor controller 150 is in the sleep mode, the main controller 120 wirelessly transmits a wake-up signal to the motor controller 150 for waking up the motor controller 150 (step 450). When the motor controller 150 is in the sleep mode, the motor controller 150 is periodically activated to receive the wake-up signal transmitted from the main controller 120. At this time, the motor controller 150 is not really woken up, but is only configured to receive the signal by using the lowest power. The processing unit 124 of the main controller 120 can further determine whether the motor controller 150 is woken up according to the state signal (such as the sleep state signal or the wake-up state signal) transmitted from the motor controller 150 (step 460). If the motor controller 150 is not woken up, the main controller 120 will re-execute step 450. When the motor controller 150 is woken up, the main controller 120 transmits a control signal to the motor controller 150 (step 470), and the motor controller 150 controls the motor 140 to drive the driving module 130 according to the control signal and the control parameters of the motor 140 (step 480) in order to perform a predetermined operation, such as the locking operation or the unlocking operation. After the motor controller 150 controlling the motor 140 to drive the driving module 130 to complete the predetermined operation, the motor controller 150 will enter the sleep mode again (step 490). For example, the motor controller 150 can automatically enter the sleep mode a predetermined time after controlling the motor 140 to drive the driving module 130 to complete the predetermined operation; or the motor controller 150 can report to the main controller 120 after controlling the motor 140 to drive the driving module 130 to complete the predetermined operation, and the main controller 120 then transmits a sleep command to the motor controller 150 to command the motor controller 150 to enter the sleep mode.

In addition, in the control method of the electric lock of the second embodiment of the present invention, the aforementioned steps need not be in the exact order shown. That is, the order of the steps can be changed and other steps can be inserted in between. For example, before step 410, the main controller 120 can enter a main sleep mode, and when the input unit 110 receives a user input (for example, a user presses a button or touches a touch panel), the input unit 110 can correspondingly generate a signal to wake up the main controller 120. On the other hand, the motor controller 150 can report to the main controller 120 that the predetermined operation is completed after controlling the motor 140 to drive the driving module 130 to complete the predetermined operation.

Moreover, the electric lock 10, 20 of the present invention can further comprises a sensing module 160 configured to sense a state of the driving module 130 (such as relative positions or relative angles between components) to generate a sensing signal. The motor controller 150 can more accurately determine whether the predetermined operation is completed according to the sensing signal of the sensing module 160. In the aforementioned steps 280 and 480, the motor controller 150 controls the motor 140 to drive the driving module 130 according to the control signal, the sensing signal and the control parameters of the motor in order to perform the predetermined operation.

Furthermore, the main controller 120 and the motor controller 150 can communicate with each other through encrypted/decrypted signals according to a predetermined encryption method. For example, the main controller 120 can encrypt the wake-up signal, the control signal, and/or the sleep command according to the predetermined encryption method, and the motor controller can encrypt the state signal according to the predetermined encryption method. The predetermined encryption method can be AES, RSA, ECC, DSA, DES, MD5, SHA, etc., but the present invention is not limited thereto.

In contrast to the prior art, the motor controller 150 of the electric lock of the present invention is independent of the main controller 120. Therefore, the user interface program and the verification mechanism in the main controller 120 and the control parameters of the motor in the motor controller 150 can be developed separately, so as to reduce development difficulty of the electric lock. The motor controller 150 only needs to decrypt and interpret the encrypted signal transmitted from the main controller 120 and further perform the corresponding predetermined operation. Therefore, the motor controller 150 can work with main controllers with different user interface programs, processing units and verification units, and the main controller can work with motor controllers storing different control parameters, so as to achieve greater benefits. In addition, the motor controller 150 of the electric lock of the present invention can enter the sleep mode when there is no predetermined operation required to be performed in order to reduce power consumption. Furthermore, the main controller 120 and the motor controller 150 can communicate with each other according to a predetermined encryption method, so as to increase security of the electronic lock.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electric lock, comprising:

an input unit configured to receive a user input entered by a user;

a main controller electrically connected to the input unit, the main controller comprising:

a processing unit;

a user interface program, wherein the processing unit is configured to control the input unit to receive the user input according to the user interface program; and a verification unit configured to compare the user input with verification data pre-stored in the verification unit to generate a comparison result;

a driving module;

a motor connected to the driving module; and a motor controller physically independent of the main controller and storing control parameters of the motor, wherein the motor controller is configured to communicate with the main controller through a wired connection or a wireless technology, wherein the control parameters comprises at least one parameter selected from motor forward and reverse running time, motor running compensation time, pulse width modulation parameters and motor power supply voltage parameters;

wherein when the main controller determines that the comparison result is successful and determines that the motor controller is in a sleep mode, the main controller is configured to transmit a wake-up signal to the motor controller for waking up the motor controller;

wherein when the motor controller is woken up, the main controller is configured to transmit a control signal to the motor controller, and the motor controller is configured to control the motor to drive the driving module to drive a predetermined mechanism, which is a latch mechanism or a clutch mechanism, of the electric lock to move to perform a locking operation or an unlocking operation according to the control signal and the control parameters of the motor.

2. The electric lock of claim 1, wherein the motor controller is configured to enter the sleep mode after controlling the motor to drive the driving module.

3. The electric lock of claim 1, wherein the motor controller is electrically connected to the main controller through the wired connection, the main controller is configured to determine whether the motor controller is in the sleep mode according to a logic level of a contact pin of the motor controller.

4. The electric lock of claim 1, wherein the motor controller is configured to wirelessly transmit a state signal to the main controller, the main controller is configured to determine whether the motor controller is in the sleep mode according to the state signal.

5. The electric lock of claim 1, further comprising a sensing module configured to sense a state of the driving module to generate a sensing signal, wherein the motor controller is configured to control the motor to drive the driving module according to the control signal, the sensing signal and the control parameters of the motor.

6. The electric lock of claim 1, wherein at least one of the wake-up signal and the control signal is an encrypted signal.

7. A control method of an electric lock, comprising:

providing an electric lock comprising an input unit, a main controller, a driving module, a motor and a motor controller, wherein the main controller comprises a processing unit, a user interface program, and a verification unit, wherein the motor controller is physically independent of the main controller and stores control parameters of the motor, wherein the motor controller is configured to communicate with the main controller through a wired connection or a wireless technology, wherein the control parameters comprises at least one parameter selected from motor forward and reverse running time, motor running compensation time, pulse width modulation parameters and motor power supply voltage parameters;

the processing unit controlling the input unit to receive a user input entered by a user according to the user interface program;

the verification unit comparing the user input with verification data pre-stored in the verification unit to generate a comparison result;

when the main controller determines that the comparison result is successful and determines that the motor controller is in a sleep mode, the main controller transmitting a wake-up signal to the motor controller for waking up the motor controller; and when the motor controller is woken up, the main controller transmitting a control signal to the motor controller, and the motor controller controlling the motor to drive the driving module to drive a predetermined mechanism, which is a latch mechanism or a clutch mechanism, of the electric lock to move to perform a locking operation or an unlocking operation according to the control signal and the control parameters of the motor.

8. The control method of claim 7, further comprising the motor controller entering the sleep mode after controlling the motor to drive the driving module.

9. The control method of claim 8, wherein the motor controller automatically enters the sleep mode a predetermined time after controlling the motor to drive the driving module.

10. The control method of claim 8, further comprising the main controller transmitting a sleep command to the motor controller after the motor controller controlling the motor to drive the driving module, wherein the motor controller enters the sleep mode according to the sleep command.

11. The control method of claim 7, wherein the motor controller is electrically connected to the main controller through the wired connection, the main controller determines whether the motor controller is in the sleep mode according to a logic level of a contact pin of the motor controller.

12. The control method of claim 7, further comprising the motor controller wirelessly transmitting a state signal to the main controller, wherein the main controller determines whether the motor controller is in the sleep mode according to the state signal.

13. The control method of claim 12, wherein the main controller wirelessly transmits the wake-up signal to the motor controller, the control method further comprises periodically activating the motor controller in the sleep mode to receive the wake-up signal transmitted from the main controller.

14. The control method of claim 7, further comprising:
the main controller entering a main sleep mode; and
the input unit waking up the main controller according to a user input entered by the user.

15. The control method of claim 7, wherein the electric lock further comprises a sensing module configured to sense a state of the driving module to generate a sensing signal, wherein the motor controller controls the motor to drive the driving module according to the control signal, the sensing signal and the control parameters of the motor.

16. The control method of claim 7, wherein at least one of the wake-up signal and the control signal is an encrypted signal.

17. The electric lock of claim 1, wherein when the main controller determines that the comparison result is successful and determines that the motor controller is not in the sleep mode, the main controller is configured to continuously determine whether the motor controller is in the sleep mode without transmitting the control signal to the motor controller.

18. The control method of claim 7, further comprising:
wherein when the main controller determines that the comparison result is successful and determines that the motor controller is not in the sleep mode, the main controller continuously determining whether the motor controller is in the sleep mode without transmitting the control signal to the motor controller.

* * * * *